United States Patent [19]

Jennings

[11] Patent Number: 5,536,975
[45] Date of Patent: Jul. 16, 1996

[54] DEVICE FOR PROJECTING SCANNING EFFECTS WITH STANDARD AUTOMOTIVE HEADLAMPS

[76] Inventor: Charles E. Jennings, 1330 Heathwick La., Houston, Tex. 77043

[21] Appl. No.: 158,467

[22] Filed: Nov. 29, 1993

[51] Int. Cl.⁶ ........................................ B60L 1/14
[52] U.S. Cl. .............. 307/10.8; 315/82; 362/61; 340/469
[58] Field of Search .................. 307/9.1, 10.1, 307/10.8; 327/172, 176, 141, 142, 522; 362/61, 212; 315/77, 79, 82, 83, 324, 363; 340/471, 425.5, 469

[56] References Cited

U.S. PATENT DOCUMENTS

| | | | |
|---|---|---|---|
| 3,732,540 | 5/1973 | Platte | 315/82 |
| 4,114,071 | 9/1978 | Thrower, Jr. et al. | 315/82 |
| 4,155,069 | 5/1979 | Mason | 315/82 |
| 4,727,261 | 2/1988 | Fairchild | 315/82 |
| 5,389,913 | 2/1995 | Boser et al. | 340/471 |

*Primary Examiner*—William M. Shoop, Jr.
*Assistant Examiner*—Richard T. Elms
*Attorney, Agent, or Firm*—James E. Bradley

[57] ABSTRACT

An add-on electrical apparatus for causing standard automotive headlamps to project scanning effects on roadways and other terrain. The device is comprised of a control module located in the vehicle near the driver, wired to two switching modules mounted between the headlamps and the standard connectors. An on-off switch and current adjustment in the control module activates the device and adjusts the speed of the scanning effect, as an oscillator generates a train of pulses which are divided into two alternate pulse trains by a flip-flop. The pulses are amplified in order to drive a pair of solid state relays, having an adjustable bypass current, whereby as the lamp on one side of the vehicle is at full brightness, the lamp on the other side is at a reduced brightness, with said effect alternating back and forth from lamp to lamp.

19 Claims, 2 Drawing Sheets

DEVICE FOR PROJECTING SCANNING EFFECTS WITH STANDARD AUTOMOTIVE HEADLAMPS

BACKGROUND OF THE INVENTION

1. Field of the Invention

This invention relates in general to the enhancement of automotive lighting systems, in particular to the headlight circuits.

2. Description of the Prior Art

A need exists to improve the automotive headlight system. There have been no significant improvements in automotive lighting since the development of the halogen gas filled bulb and the sealed beam lamp assembly.

In the prior art, standard automotive lighting systems consists mainly of an alternator powered by the vehicle's engine, a voltage regulator, and storage battery. Wiring runs from the battery to the fuse distribution panel mounted near or under the dashboard. Located in the wiring circuits, between the fuse panel and the various lamps, are the on-off switches. Some motor vehicles have four headlamp systems with separate filaments in each headlamp, two for the low beam lamps and two for the high beam lamps. Other four lamp systems include two lamps with two high beam filaments only, with the other two lamps having filaments for both the low beams and high beams. Vehicles that are equipped with two headlight systems have two separate filaments in each lamp for both low beams and high beams.

Located in the circuit between the headlamps and the on-off switch is the low beam high beam selector switch, mounted on either the floorboard or in the steering column, usually in the same housing as the turn signal switch. At the rear of the vehicle are the tail lights, preferably two, one on each side. Each assembly usually contains one bulb with two filaments. One reduced brightness filament is on when the headlights, parking lights or the turn signals are on. The brighter filament, which is illuminated by a pressure switch located on the brake's master cylinder, is closed when the brakes are applied, or flashes on and off when the emergency flasher switch (usually mounted on the steering column) is closed.

The problem with the prior art is with the low beam headlamps, which are usually fixed focus bulbs or sealed beam assemblies, each producing about 55 watts of power in the form of visible light. As a result of the limited power low beam headlamps being rigidly fixed in the vehicle at the shallow angle relative to the roadway, a certain amount of radiation is wasted in the form of reflected light, depending on the color and texture of the roadway. This reflected light is somewhat blinding and annoying to the drivers of oncoming vehicles, especially if the roadway is wet. Dry black pavement is less reflective than cement or light colored pavement, and it absorbs more light. This makes holes and objects in the roadway very difficult to see, especially in areas which are not well-illuminated by street lights.

Another serious problem with steady burning headlights when driving a vehicle in rain or fog is the back glare into the eyes of the driver and occupants.

SUMMERY OF THE INVENTION

In this invention, each low beam headlamp is caused by the electronic control system to change from the normal brightness to a shorter wavelength, or lower degree of brightness for a brief moment before reverting back to the normal state. This alternative wavelength is switched from one headlamp to the other so when one lamp is at full brightness, the opposite lamp is illuminated at a reduced brightness. This phenomenon creates a scanning effect which enhances the vision of the vehicle's occupants, especially in rain, fog, or against the glare of oncoming headlights or dark roadways.

The electrical control system is made up of three interconnecting modules—one control module and two switching modules, referred to as the first switching module and the second switching module. The switching modules are plugged between the headlamps and the standard headlamp connectors. The control module, which is contained in a small housing, is located inside the vehicle, preferably in or below the dashboard. The electronics include fixed resistors, an on-off switch, a variable resistor, an oscillator circuit, a flip-flop pulse divider, and two switching transistors. The first switching module, which is encased in a small housing with heat sinks, is made up of an electromechanical relay, a solid state relay, two resistors, a fuse, a fuse holder, the wiring, and connectors. The second switching module is the same as the first switching module, but it has only one resistor and no fuse.

When the switch in the control module is closed, control current is supplied through jumper wires to the coil in the single pole double throw relays in the switching modules, therefore isolating the headlights from the normal circuit while communicating them with the control circuit. At the same time, the oscillator, the flip-flop pulse divider, and signal amplifying transistors, which are located in the control module, are energized. This switches on for a brief moment the first of a pair of solid state relays, which are located in the switching modules, then switches the second solid state relay on just before the first relay switches off so at no time is full current to both the headlights off. As long as the switch in the control module is on, the cycle is repeated.

The solid state relays in the relay modules are slave to the transistors in the control module. A suitable resistor mounted to the exterior of each of the relays connects the power input to the power output. While the relays are receiving a control pulse, the headlights are illuminated to their full brightness; between these pulses, the relays are switched off. During the moment the relay is off, current is bypassed around the relays, through the resistors, to the low beam headlights, at a reduced level. The fixed resistors in the control circuit limit the current to the integrated circuits of the oscillator and flip-flop pulse divider. Adjusting the variable resistor in the control module sets the alternative pulse rate of the system.

DETAILED DESCRIPTION OF THE INVENTION

Figure 2:
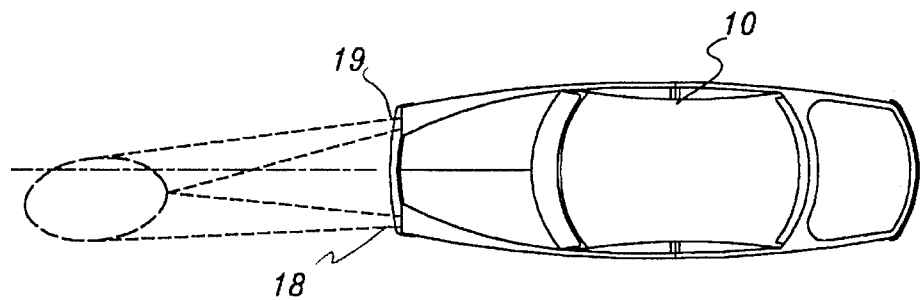
FIG. 2 is the same plan view as FIG. 1, except showing the headlamp on the left at full brightness and the lamp on the right at the reduced brightness, giving the appearance that the headlamps are panned to the left.
Figure 1:
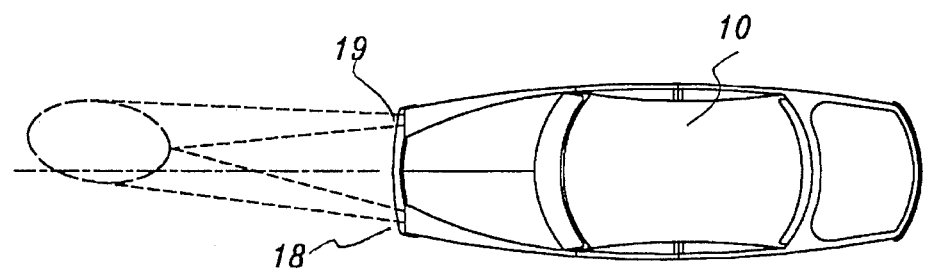
FIG. 1 is a plan view of an automobile with the headlamps having the appearance that they are shifted or panned to the right. This is caused by the headlamp on the left being illuminated at a reduced brightness, while the lamp on the right is illuminated at full brightness.

A motor vehicle 10 having headlamps 18, 19 is shown in FIGS. 1 and 2. The standard 12 volt headlight wiring system is enhanced by the addition of an electrical control assembly that is designed to cause scanning or panning effects, with the projected light illuminating from the low beam lamps 18, 19 against a solid surface as illustrated in FIG. 1 and FIG. 2. In FIG. 1, the light appears to be projected to the right, whereas in FIG. 2 the light appears to be projected to the left. This scanning effect is adjustable from zero to around 60 hertz.

Figure 3:
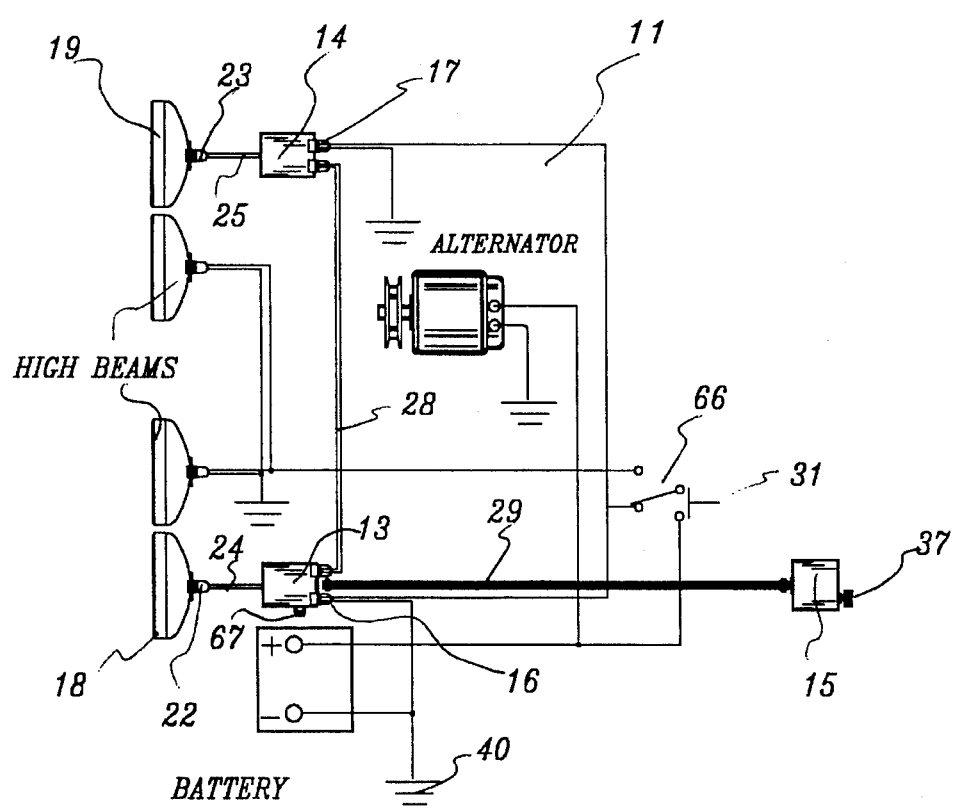
FIG. 3 is a block diagram of the improved lighting system showing how the control system is made up of three interconnecting modules, and how they are connected to a standard automotive lighting system.
Figure 4:
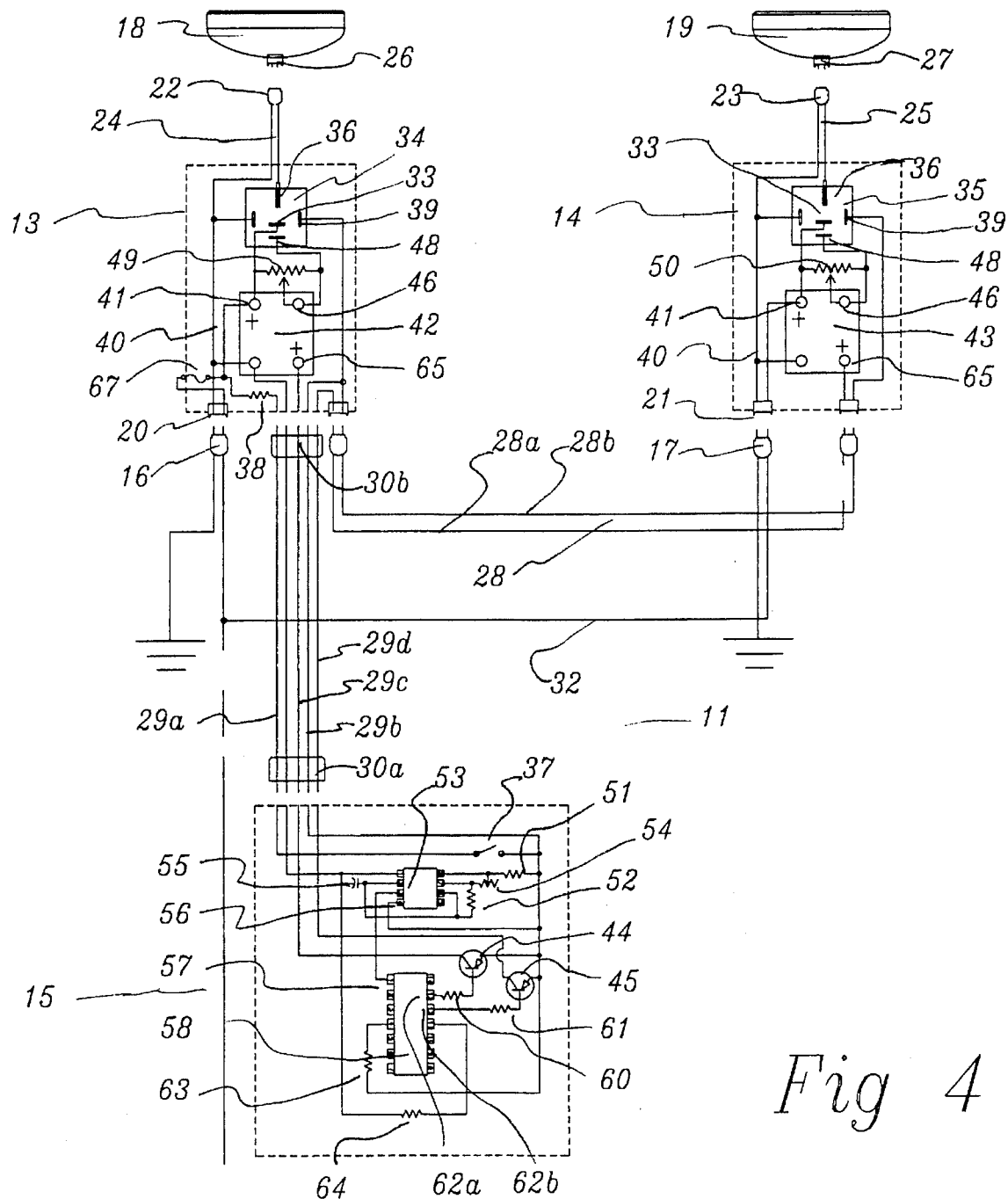
FIG. 4 is a schematic view illustrating the circuitry of the three control modules and how they interact with the standard lighting system.

Referring to FIGS. 3 and 4, a simplified illustration showing how the complete control assembly, consisting of the first switching module 13, second switching module 14, and control module 15 encased in ventilated housings, is connected to the typical low beam wiring system 11 of the average motor vehicle. Referring now to FIG. 3, modules 13 and 14 are installed into the system by unplugging the female connectors 16 and 17 from lamps 18 and 19, and plugging them onto prongs 20 and 21 on the first end of switching modules 13 and 14. Similar connectors 22 and 23 on extension wires 24 and 25, which are fixed to the second end of switching modules 13 and 14, are plugged onto prongs 26 and 27 of low beam headlamps 18 and 19. Detachable two conductor jumper assembly 28 connects the two relay modules 13 and 14 electrically. Control module 15, which is preferably located inside the passenger compartment (not shown) of the vehicle 10 (FIGS. 1 and 2), is connected to relay module 13 with 5-wire detachable jumper 29 and connectors 30a and 30b.

Referring again to FIGS. 3 and 4, a total of eleven conductor wires, contained in four jumpers, are connected to the first switching module 13. On the first end of module 13 are two individual pairs of conductor wires, one pair in jumper assembly 28 and one pair in the vehicle's standard low beam headlight jumper 16. Jumper 29 contains a set of five conductor wires connected between the first end of switching module 13 and the control module 15 with connectors 30a and 30b. Jumper 24, which is connected to the second end of switching module 13, replaces the standard equipment low beam headlight jumper 16 and, with connector 22, plugs onto low beam headlight 18. The second switching module 14 has two pairs of conductor wires extended from the first end, which are two conductor wires in jumper 28, and two conductor wires in the standard equipment headlight jumper 17. Extending from the second end of the second switching module 14 is jumper 25, replacing jumper 17 and, with connector 23, plugs onto low beam headlight 19.

In normal operation, when the vehicle's lighting system switch 31 (FIG. 3) is closed, all appropriate driving lamps, in particular the headlamps, are illuminated, allowing full system current to take the normal path from positive conductor 32 of standard headlamp jumpers 16 and 17 to input pins 33 of single pole, double throw electromechanical relays 34 and 35, located in switching modules 13 and 14, and out pins 36, through jumpers 24 and 25, to headlights 18 and 19, providing the two position, low beam high beam selector switch (dimmer switch) 66 is in the first or low beam position. If switch 66 is switched to the second or high beam position, current to switching modules 13 and 14 and control module 15 is disconnected. However, when switch 66 is in the low beam position and control switch 37, located in control module 15, is closed, as shown in FIG. 3, current limited by resistor 38 in switching module 13 is conducted through wire 29a in jumper 29, through switch 37, back through conductor wire 29b, to input pin 39 of the energizing coils in the electromechanical relays 34. This control current is conducted on from switching module 13, through conductor wire 28b in jumper 28, to pin 39 of relay 35 in the second switching module 14, and then to system ground 40.

As is obvious in FIG. 4, as long as the headlight switch 31 (FIG. 3), located in the vehicle's passenger compartment (not shown), is closed, current supplied to circuit 11 of the low beam light system is always present at power input termination 41 of solid state relays 42 and 43, but blocked there until switch 37 is closed. This not only energizes the coil of electromechanical relays 34 and 35, thus shifting the relay to the second position, but also activates timer 53 and flip-flop 58 and generates control pulses which are emitted alternately from transistors 44 and 45, located in control module 15, where the pulse from transistor 44 is conducted through conductor wire 29c of jumper 29 to trigger input 65 of solid state relay 42, and alternate pulse from transistor 45 is conducted through conductor 29d in jumper 29, on through conductor 28a in jumper 28, to trigger input 65 of solid state relay 43.

To further explain the operation of the switching modules 13 and 14, energizing the coil of the single pole, double throw electromechanical relays 34 and 35 at pins 39 shifts the relays contacts from the first position, where constant current is conducted in pins 33 and out pins 36, to low beam headlamps 18 and 19, to the second position where current present at terminals 41 of solid state relays 42 and 43 is pulsed out terminals 46, alternately from each of the relays, for the duration of each control pulse received at terminals 65. This modulating current is then conducted to pins 48 of electromechanical relays 34 and 35 and out pins 36 to low beam headlights 18 and 19.

Variable resistors 49 and 50, adjustable from one to three ohms, are attached between input and output terminals 41 and 46 of solid state relays 42 and 43. This allows current at a reduced rate to bypass solid state relays 42 and 43 to headlights 18 and 19 during the brief off interval between the pulses.

To clarify the operation of the control module in FIG. 4, current limited by resistors 51 and 52 is conducted to oscillator 53, which is made up of an integrated circuit, 555 timer or similar device, in cooperation with variable resistor 54 and capacitor 55, producing a string of pulses from pin 56, which are conducted to input 57 of pulse divider 58, comprising of a 7473 integrated circuit flip-flop or similar device where the pulses are divided by two and emitted at pins 62a and 62b.

Transistors 44 and 45 in the control circuit are switched on alternately as their base is energized by negative pulse trains limited by resistors 60 and 61, connected to pins 62a and 62b of flip-flop pulse divider 58. Resistors 63 and 64 limit the amount of current to flip-flop 58. The positive control pulses from transistors 44 and 45 are conducted through jumpers 29 and 28, to the trigger input of the solid state relays 42 and 43, thus switching them alternately on and off, and therefore allowing the maximum current to flow from pins 46 of solid state relays, into input pin 48 and out pin 36 of electromechanical relays 34 and 35, to low beam headlamps 18 and 19.

As each of the solid state relays 42 and 43 alternate to the off state, current is bypassed to low beam headlamps 18 and 19, through variable resistors 49 or 50. For the brief interval that the solid state relays are off, the headlamp radiates at a reduced brightness. Item 67 is a replaceable line fuse for overload protection of the components in control module 15.

I claim:

1. An electrical headlight lighting system for motor vehicles used for illuminating an area while driving, comprising in combination:

a pair of electrically powered headlamps which are rigidly fixed to a motor vehicle so that each headlamp is oriented to emit light focused at a different point to illuminate a given area;

power means for coupling an electrical power source to each of the headlamps for supplying a high intensity level of power to each of the headlamps to cause each of the headlamps to emit light at normal brightness;

power reduction means selectively electrically coupled to the power means, having a low level position for reducing the power supplied to each of the headlamps from the high intensity level to a lower intensity level and having a high level position for allowing power to be supplied to each of the headlamps at the high intensity level; and control means for controlling the power reduction means to alternately shift the power reduction means for each of the headlamps between the high level and low level positions at a selected frequency and such that one of the headlamps will be supplied with power at the lower intensity level while the other of the headlamps will be supplied with power at the high intensity level, to produce a scanning effect of the illuminated area.

2. The headlight lighting system according to claim 1 wherein the power reduction means comprises:

a current limiting resistor connected to the power means for reducing the current supplied to each of the headlamps to provide the low level position;

a bypass line connected to the power means and bypassing the current limiting resistor to provide the high level position;

a switch connected between the power means and the current limiting resistor and the bypass line for alternately switching the power means to the current limiting resistor and to the bypass line.

3. The headlight lighting system according to claim 1 wherein the control means comprises:

oscillator means for producing pulses to the power reduction means to cause the power reduction means to alternately shift between the high and low level positions for each of the headlamps.

4. The headlight lighting system according to claim 1 wherein there are two of the power reduction means, one for each of the headlamps, and wherein one of the power reduction means will be in the low level position while the other is in the high level position.

5. The headlight lighting system according to claim 1 wherein the power reduction means comprises:

a pair of current limiting resistors, one for each of the headlamps, each connected to the power means for reducing the current supplied to each of the headlamps to provide the low level position;

a pair of bypass lines, one for each of the headlamps, each connected to the power means and bypassing one of the current limiting resistors to provide the high level position; and a pair of switches, one for each of the headlamps, each connected to the power means and to one of the current limiting resistors and to one of the bypass lines for alternately switching the power means to one of the current limiting resistors to provide the low level position and to one of the bypass lines to provide the high level position; and wherein the control means comprises:

oscillator means for producing pulses to the switches to cause each of the switches to alternately shift between the high and low level positions.

6. The headlight lighting system of claim 1 further comprising:

mode switch means for selectively disconnecting the power reduction means from the power means to cause both of the headlamps to emit light continuously at the normal brightness.

7. The headlight lighting system of claim 1 wherein each of the headlamps has low beam and high beam filaments, and wherein the power reduction means is electrically coupled to the power means only when the headlamps are switched to the low beam filaments.

8. The headlight lighting system according to claim 1 wherein before moving the power reduction means to the low level position for one of the headlamps, the control means and the power reduction means moves the power reduction means for the other of the headlamps to the high level position, to assure that at no time will both headlamps be at the low intensity level.

9. An electrical headlight lighting system for motor vehicles used for illuminating an area while driving, comprising in combination:

a pair of headlamps rigidly fixed to a motor vehicle so that each headlamp is oriented to emit light focused at a different point to illuminate a given area;

power means for coupling an electrical power source to each of the headlamps for supplying a selected high intensity level of current to each of the headlamps to cause each of the headlamps to emit light at normal brightness;

current limiting means selectively connected to the power means for reducing the current supplied to each of the headlamps from the high intensity level to a lower intensity level;

a bypass line connected to the power means for bypassing the current limiting means for allowing the current supplied to each of the headlamps to be at the high intensity level;

switching means for alternately switching the power means between the current limiting means and the bypass line;

means for supplying signals to the switching means at a selected frequency to alternately switch the power means to the current limiting means for one of the headlamps while switching the power means to the bypass line for the other of the headlamps, so that the headlamps alternate with each other in producing light at the normal brightness and at a lower brightness level; and wherein before the switching means switches the power means to the current limiting means of one of the headlamps, the switching means will have already switched the power means to the bypass line for the other of the headlamps, to thereby produce a scanning effect of the illuminated area.

10. The headlight lighting system of claim 9 wherein the lower intensity level of current causes each of the headlamps to emit light at a different wavelength than when at normal brightness.

11. The headlight lighting system of claim 9 wherein the current limiting system comprises a current limiting resistor.

12. The headlight lighting system of claim 9 further comprising:

mode switch means for selectively disconnecting the current limiting means and the bypass line from the power means to cause both of the headlamps to emit light continuously at the normal brightness.

13. The headlight lighting system of claim 9 wherein there are two of the bypass lines and two of the current limiting means, one for each of the headlamps.

14. The headlight lighting system of claim 9 wherein each of the headlamps has low beam and high beam filaments, and wherein the bypass line and the current limiting means are connected to the power means only when the headlamps are switched to the low beam filaments.

15. A method of illuminating an area while driving a motor vehicle comprising the steps of:

mounting a pair of electrically powered headlamps to the motor vehicle so that the headlamps are rigidly fixed thereto with the headlamps being oriented so that light emitted from the headlamps is focused at a different point to illuminate a given area;

coupling an electrical power source to each of the headlamps for supplying a high intensity level of power to each of the headlamps to cause each of the headlamps to emit light at normal brightness;

connecting a power reduction circuit between the power source and each of the headlamps which has a low level position which reduces the power supplied to each of the headlamps from the high intensity level to a lower intensity level, and which has a high level position which allows power at the high intensity level to pass to each of the headlamps; and controlling the power reduction circuit to alternately shift the power reduction circuit between the high and low level positions at a selected frequency for each of the headlamps, and such that one of the headlamps will be supplied with power at the lower intensity level while the other of the headlamps will be supplied with power at the high intensity level, to produce a scanning effect of the illuminated area.

16. The method according to claim 15, wherein the step of connecting a power reduction circuit to the power source comprises:

connecting a current limiting resistor between the power source and one of the headlamps, and causing current to flow through the current limiting resistor to provide the low level position;

connecting a bypass line to the power source and to one of the headlamps, bypassing the current limiting resistor, to provide the high level position; and connecting a switch to the power source and to the current limiting resistor and to the bypass line for alternately switching the power source to the current limiting resistor and to the bypass line.

17. The method according to claim 15 wherein the step of controlling the power reduction means comprises:

producing pulses to the power reduction circuit to cause the power reduction circuit to alternately shift between the high and low level positions for each of the headlamps.

18. The method according to claim 15 wherein the step of mounting a pair of headlamps to a vehicle comprises providing each of the headlamps with low beam and high beam filaments; and wherein the step of controlling the power reduction circuit occurs only when the headlamps are switched to the low beam filaments.

19. The method according to claim 15 wherein during the step of controlling the power reduction circuit, before shifting the power reduction circuit to the low level position for one of the headlamps, the power reduction circuit will have already been switched to the high level position for the other of the headlamps.

\* \* \* \* \*